(12) United States Patent
Depta et al.

(10) Patent No.: US 12,679,559 B2
(45) Date of Patent: Jul. 14, 2026

(54) AIRCRAFT NAVIGATION LIGHT AND AIRCRAFT COMPRISING THE SAME

(71) Applicant: Goodrich Lighting Systems GmbH & Co. KG, Lippstadt (DE)

(72) Inventors: Marion Depta, Lippstadt (DE); Anil Kumar Jha, Lippstadt (DE); Björn Schallenberg, Geseke (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 19/036,307

(22) Filed: Jan. 24, 2025

(65) Prior Publication Data

US 2025/0242941 A1 Jul. 31, 2025

(30) Foreign Application Priority Data

Jan. 30, 2024 (EP) .................................... 24154763

(51) Int. Cl.
| | |
|---|---|
| *B64D 47/06* | (2006.01) |
| *F21S 43/14* | (2018.01) |
| *F21S 43/20* | (2018.01) |
| *F21W 107/30* | (2018.01) |
| *F21Y 115/10* | (2016.01) |

(52) U.S. Cl.
CPC .............. *B64D 47/06* (2013.01); *F21S 43/14* (2018.01); *F21S 43/255* (2018.01); *B64D 2203/00* (2013.01); *F21S 2243/00* (2024.05); *F21W 2107/30* (2018.01); *F21Y 2115/10* (2016.08)

(58) Field of Classification Search
CPC ..... B64D 47/06; B64D 2203/00; F21S 43/14; F21S 43/255; F21W 2107/30
See application file for complete search history.

(56) References Cited

U.S. PATENT DOCUMENTS

| | | | | |
|---|---|---|---|---|
| 3,706,968 | A | * 12/1972 | Turner, Jr. ............. | G08G 5/723 |
| | | | | 340/955 |
| 5,381,312 | A | 1/1995 | Authier | |
| 6,520,664 | B1 | 2/2003 | Amrein et al. | |
| 10,202,205 | B2 | 2/2019 | Schoen et al. | |
| 10,618,672 | B2 | 4/2020 | Jha et al. | |

(Continued)

FOREIGN PATENT DOCUMENTS

| | | |
|---|---|---|
| DE | 202010002772 | 7/2010 |
| EP | 3584171 | 12/2019 |
| KR | 20040092374 | 11/2004 |

OTHER PUBLICATIONS

European Patent Office, European Search Report dated Jul. 5, 2024 in Application No. 24154763.7.

*Primary Examiner* — Christopher E Dunay
(74) *Attorney, Agent, or Firm* — SNELL & WILMER L.L.P.

(57) ABSTRACT

An aircraft navigation light comprises a support portion, a light source comprising at least one green LED, the light source being arranged on the support portion, an optical element arranged over the light source for shaping an aircraft navigation light output, and a red light filter. A method of producing an aircraft navigation light comprises the steps of providing a support portion, providing a light source comprising at least one green LED, arranging the light source on the support portion, molding an optical element over the light source, and molding a red light filter over the optical element.

20 Claims, 8 Drawing Sheets

(56) References Cited

U.S. PATENT DOCUMENTS

| | | | |
|---|---|---|---|
| 10,919,644 B2 | 2/2021 | Pawliczek et al. | |
| 2011/0128729 A1* | 6/2011 | Ng | F21V 7/0008 |
| | | | 362/231 |
| 2019/0144131 A1* | 5/2019 | Jha | B64D 47/06 |
| | | | 362/470 |
| 2020/0189766 A1* | 6/2020 | Jha | G08G 5/80 |
| 2023/0264832 A1* | 8/2023 | Depta | B64D 47/06 |
| | | | 362/470 |
| 2024/0151378 A1* | 5/2024 | Dong | F21S 41/321 |
| 2024/0219318 A1* | 7/2024 | Jha | G01N 21/958 |
| 2024/0246695 A1* | 7/2024 | Depta | F21S 43/14 |

* cited by examiner

AIRCRAFT NAVIGATION LIGHT AND AIRCRAFT COMPRISING THE SAME

CROSS-REFERENCE TO RELATED APPLICATIONS

This application claims priority to EP Patent Application No. 24154763.7, filed Jan. 30, 2024 and titled "AIRCRAFT NAVIGATION LIGHT AND AIRCRAFT COMPRISING THE SAME," which is incorporated by reference herein in its entirety for all purposes.

FIELD

The present invention relates to exterior aircraft lighting. In particular, it relates to aircraft navigation lights.

BACKGROUND

Almost all aircraft are equipped with exterior lighting systems. For example, large commercial aircraft have many different exterior lights. An exemplary group of exterior aircraft lights are lights for passive visibility, such as navigation lights and anti-collision lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are scan lights that allow the inspection of the aircraft structure in the dark, such as wing scan lights. It is apparent that the exterior lighting systems of modern aircraft are very complex technical systems.

Accordingly, it would be beneficial to provide an aircraft navigation light that allows for an overall less complex exterior aircraft lighting system and to provide an aircraft equipped therewith. Furthermore, it would be beneficial to provide a method of producing such an aircraft navigation light.

SUMMARY

Exemplary embodiments of the invention include an aircraft navigation light, comprising a support portion, a light source comprising at least one green LED, the light source being arranged on the support portion, an optical element arranged over the light source for shaping an aircraft navigation light output, and a red light filter.

Exemplary embodiments of the invention allow for the provision of an aircraft navigation light with a green light output, i.e. an aircraft navigation light that is commonly used on the right side of the aircraft, wherein said aircraft navigation light with a green light output has a brightness that is perceived to be comparable to the brightness of an aircraft navigation light with a red light output of the same design, i.e. an aircraft navigation light that is commonly used on the left side of the aircraft. In previous approaches, when providing green and red aircraft navigation lights of the same design, the green aircraft navigation light is often times perceived as brighter. This is because commonly available green LEDs produce more luminous flux than commonly available red LEDs. With the provision of the red light filter, the luminous flux of the green navigation light output may be reduced, while the red light filter is suitable to keep the light output in an acceptable shade of green for the green aircraft navigation light. When used for a left aircraft navigation light, the red light filter reduces the luminous flux of the red navigation light output to a much lesser extent and is not detrimental to the acceptability of the resulting shade of red. As a result, the same design of the aircraft navigation light may be used for the right side of the aircraft and the left side of the aircraft, and the resulting green and red navigation light outputs may be perceived to have highly comparable brightnesses. With only different color light sources being employed/selectively used for the right and left aircraft navigation lights, the certification efforts for the right and left aircraft navigation lights can be kept particularly low. Accordingly, aircraft navigation lighting with beneficial optical properties and low certification requirements may be provided. The aircraft navigation light comprises the support portion. Other features of the aircraft navigation light may be fixed or mounted to the support portion. Thus, the support portion may provide support and/or an electrical connection to other parts of the navigation light. The support portion may comprise a printed circuit board. In this way, the support portion may be able to provide physical support and mechanical stability as well as an electrical connection to other parts of the aircraft navigation light, in particular to the light source.

The aircraft navigation light further comprises the light source. The light source comprises the at least one green LED. This enables the aircraft navigation light to produce green light. Furthermore, the light source is arranged on the support portion. Thus, a structural and/or electrical connection with the support portion may be created. The at least one green LED may be soldered onto the support portion, e.g., the PCB. The light source may comprise at least one further light emitting device. In this way, it is possible for the light source to emit different light colors.

In addition, the aircraft navigation light comprises the optical element. The optical element is arranged over the light source for shaping an aircraft navigation light output. The light emitted by the aircraft navigation light may, thus, be shaped as desired or prescribed by regulation. The optical element may transform the light intensity distribution, as emitted by the light source, into the aircraft navigation light output by itself or may be part of a multi-element optical system that transforms the light intensity distribution, as emitted by the light source, into the aircraft navigation light output. In either case, the optical element contributes to the creation of the aircraft navigation light output. It is thus described as being provided for shaping the aircraft navigation light output.

The aircraft navigation light further comprises the red light filter. The red light filter allows for a selectively higher transmission of red light than some other frequencies of light. The light emitted from the light source may be attenuated by the red light filter, dependent on the frequency of the emitted light. For example, a green component of the light emitted by the light source may be attenuated more strongly by the red light filter than a red component. The red light filter may, thus, modify the light spectrum and luminous flux emitted by the aircraft navigation light.

The optical element may comprise a lens, with the lens enclosing the at least one green LED exclusively. Alternatively, the lens may jointly enclose the at least one green LED and the at least one further light emitting device. In this way, the lens may be well-positioned to modify the light output of both the at least one green LED and the at least one further light emitting device in a desired manner. The lens may be a molded structure. In particular, the lens may be overmolded over the light source. The lens may be in direct contact with the light source. It is also possible that the lens is spaced from the light source or parts thereof. The lens may be a refractive lens. It may also have reflective portions. The lens may be made from a highly resistant and durable material, such as silicone. However, the lens may be made from any transparent or translucent material that has suitable refractive and, potentially, reflective properties.

When the at least one green LED is operated, the aircraft navigation light emits a green aircraft navigation light output. Despite traveling through the red light filter, the emission of the at least one green LED stays within the acceptable range of green light shades for right aircraft navigation lights. The aircraft navigation light is usable as a right forward navigation light.

According to a further embodiment, the red light filter is integrated in or identical to the optical element, in particular when the optical element is or comprises a lens. In this case, the optical element may act as the red light filter. In particular, the optical element may show a higher transmission for red light than for some other light frequencies, e.g., green light. The red light filter being integrated in or identical to the optical element may lead to a reduction in parts and, thus, to a possible reduction in production costs. In some embodiments, the red light filter could be integrated into the optical element, in particular into the lens of the optical element, by the introduction of red particles or a red dye into at least one material of the optical element, such as silicone.

According to a further embodiment, the red light filter is arranged such that light emitted from the light source passes through the red light filter before it passes through the optical element. To this end, the red light filter may be arranged between the light source and the optical element, in particular the lens of the optical element. Thus, the optical path from the light source to the optical element may at least in part pass through the red light filter. The red light filter may be overmolded over the light source. Subsequently, the optical element may be molded over the red light filter. In this way, it may be achieved that the thickness of the red light filter has a low variation or is constant. Thus, the attenuation for a given frequency of light, e.g., red light, may show low variation for different angles of light output.

According to a further embodiment, the red light filter is arranged such that light emitted from the light source passes through the red light filter after it passes through the optical element. In this case, the optical path from the light source to the red light filter may at least partly pass through the optical element, in particular through the lens of the optical element. The optical element may be molded over the light source and the red light filter may subsequently be molded over the optical element.

According to a further embodiment, the red light filter is immediately adjacent to the optical element. The red light filter may be implemented as a layer that is immediately attached or fixed to the optical element. The layer may have a substantially constant thickness/a thickness with low variation. The layer may be positioned on the surface of the optical element facing the light source or on the surface of the optical element facing away from the light source. In the embodiment having the red light filter immediately adjacent to the optical element, light transmission may be increased. The embodiment may further lead to potentially compact designs.

According to a further embodiment, a gap or intermediate element is positioned between the red light filter and the optical element. The intermediate element may keep the optical element and the red light filter in a predefined relative position to each other. The gap may be filled with air or another gas. In some cases, the gap may contain a vacuum.

According to a further embodiment, the red light filter contains silicone or consists of silicone. In particular, the silicone of the red light filter comprises at least one of red pigments and a red dye. The red pigments and/or red dye may provide better transmission for red light than for other frequencies of light. According to a further embodiment, the optical element contains silicone or consists of silicone. Silicone may provide good mechanical and optical properties for use in the aircraft navigation light.

The red light filter may have a continuous thickness. In this way, the attenuation for a given frequency of light from the light source may be constant or very similar across large parts or even across the entire surface of the red light filter. Thus, it may be achieved that the spectrum of light emitted by the aircraft navigation light shows little or essentially no variation across various angles of light output.

According to a further embodiment, the aircraft navigation light output satisfies a set of Federal Aviation Regulation (FAR) requirements for forward navigation lights, also commonly referred to as forward position lights. In particular, the aircraft navigation light provides the luminous flux and/or the color spectrum required for forward navigation lights by the relevant FAR regulations. The set of FAR requirements may be FAR sections 25.1385-25.1397 for airplane navigation lights or may be FAR sections 27.1385-27.1397 for rotorcraft navigation lights.

The aircraft navigation light may produce green light, namely a green aircraft navigation light output, and in particular light of a different spectrum, color or frequency, in particular red light/a red aircraft navigation light output. To this end, the light source may contain, in addition to the at least one green LED, at least one further light emitting device. In particular, the light source may comprise a device emitting red light.

According to a further embodiment, the light source comprises at least one red LED. In this way, the aircraft navigation light may send out red and green light. In particular, the light source may comprise only the at least one green LED and the at least one red LED and no further light emitting devices. In this way, the aircraft navigation light may assume the functionality of two navigation lights with a minimum number of light emitting devices.

According to a further embodiment, the aircraft navigation light is configured to be usable as left forward navigation light, which emits red light/a red aircraft navigation light output, and as a right forward navigation light, which emits green light/a green aircraft navigation light output. The aircraft navigation light may be employed as a left aircraft forward position light and as a right aircraft forward position light. According to the relevant regulations, left aircraft forward position lights should be in aviation red color, while right aircraft forward position lights should be in aviation green color. Aviation green color may be provided by the green LED of the light source and aviation red color may be provided by the red LED of the light source. The aircraft navigation light being usable both as left and right forward navigation light allows for the production, storage, and assembly line usage of only one type of aircraft navigation light for two locations. As compared to previous approaches, where two different, but confusingly similar aircraft navigation lights were used, exemplary embodiments of the invention allow for efficiency gains in the production of aircraft navigation lights, space savings in the storage of aircraft navigation lights, reduction in assembly errors during the mounting of the aircraft navigation lights to the respective aircraft, and/or reduction of assembly time losses due to the hold-ups of the assembly line of the aircraft.

As indicated above, the optical element may create the aircraft navigation light output by itself or may be part of a multi-element optical system. Such multi-element optical system may comprise a shutter element. In particular, such multi-element optical system may comprise a shutter element in addition to an optical element being embodied as a lens. The shutter element may be a common shutter element, arranged for blocking a portion of the light emitted by either one of the at least one green LED and the at least one red LED. The common shutter element may block light in such a way that no light of a particular color overlaps into an unintended region. In particular, the common shutter element may be arranged to block green light from being emitted towards a left side of the aircraft and to block red light from being emitted towards a right side of the aircraft.

The aircraft navigation light may be of a substantially mirror-symmetric design. In this way, the aircraft navigation light is well adapted for use, because the requirements for aircraft navigation lights are generally symmetric with regards to a horizontal plane. The term substantially symmetric means that the aircraft navigation light is symmetric in design with respect to its optical setup. It is apparent that the non-optical parts of the aircraft navigation light, such as the circuitry thereof, may be arranged in a non-symmetric manner without affecting the generally symmetric design of the aircraft navigation light.

According to a further embodiment, the luminous flux of the aircraft navigation light, when employed as a left forward navigation light and when the red LED is supplied with a predefined electrical current, is between 80% to 120%, in particular between 90% to 110%, of the luminous flux of the aircraft navigation light, when employed as a right forward navigation light and when the green LED is supplied with the said predefined electrical current. Green LEDs frequently have a higher efficiency in light production than red LEDs. For the same electrical current provided, green LEDs in some cases provide 50% more luminous flux than red LEDs. In particular, by using a red light filter, light output of green light is reduced while light output of red light is less affected. This way, the difference in luminous flux may be reduced when compared to a design without a red light filter. The higher efficiency of green LEDs and their larger luminous flux, when compared to red LEDs provided with the same predefined current, may make an aircraft navigation light of previous approaches appear brighter when used as a right aircraft forward position light than when used as a left aircraft forward position light. This may run counter to existing aircraft regulation or counter to design goals of aircraft manufacturers, such that the green LED may need to be provided with lower electrical current than the red LED, which may necessitate a different power supply for the two colors. This may increase production costs and costs of storage of the relevant parts. Providing a red light filter on top of the light source may avoid said issues and may enable the use of the same power supply for both red and green LEDs, while keeping a similar luminous flux for both colors.

According to a further embodiment, the aircraft navigation light comprises a joint power supply for the at least one green LED and the at least one red LED. In particular, the power supply is designed to provide the same predefined current to the at least one green LED and to the at least one red LED, while only one of the at least one green LED and the at least one red LED emit light at any one time. The joint power supply may be selectively couplable to the at least one green LED or the further light emitting device, in particular the at least one red LED, via one or more switches. In this way, the circuit complexity regarding the driving of the light sources may be kept low. The joint power supply may drive a selected one of the at least one green LED and the at least one red LED at a predefined electric current that is independent on the LED color. In this way, circuit complexity may be reduced.

According to a further embodiment, the aircraft navigation light may comprise a switching circuit, wherein the switching circuit is configured to either supply the at least one green LED or the at least one red LED with electricity. In particular, the switching circuit may be configured to either supply the at least one green LED or the at least one red LED with a predefined electrical current. The switching circuit may select the LED to be powered depending on a color selection signal. In particular, the aircraft navigation light may be able to adapt its light output in accordance with the color selection signal. The color selection signal may be generated internally within the aircraft navigation light or may be provided from an external command or may be derived from the connection of the aircraft navigation light to its environment in the aircraft. The color selection signal may also be seen as an operating mode command, with light emission of the at least green LED and light emission of the at least one red LED within the light source representing different operating modes of the aircraft navigation light. The aircraft navigation light may be operated in at least two operating modes, with the color selection signal selecting the operating mode for a given operating condition/aircraft navigation light position within the aircraft.

The color selection signal may be any kind of encoded form of information regarding the selection of the color. It may be a binary signal, controlling a simple switch for two operating modes. It may also be a signal that has the information encoded in a more elaborate protocol.

In particular, the switching circuit may be implemented such that when used as a left aircraft forward position light, only the at least one red LED is switched on while the at least one green LED remains switched off. The reverse may happen when the aircraft navigation light is used as a right aircraft forward position light. In this case, the at least one green LED is switched on while the at least one red LED remains switched off.

According to a further embodiment, the aircraft navigation light comprises an orientation sensor. The orientation sensor may be configured to detect an orientation of the aircraft navigation light. Furthermore, the orientation sensor may provide an orientation indication to the switching circuit. In this way, the aircraft navigation light may detect its own orientation and choose the correct color for the light source. The aircraft navigation light may, thus, be used on the left and right wing while the correct color of the light source is selected automatically. In this way, the aircraft navigation light has inherent means for determining, which functionality is desired and may select the appropriate color without external input and without configuration during assembly. The aircraft navigation light may deduce from its orientation which position within the aircraft it has and may carry out an according color selection. When detecting whether a light is flipped with respect to a reference position, the orientation sensor may deduce whether the functionality of a right aircraft navigation light or a left aircraft navigation light is desired.

The orientation sensor may be an inertial sensor, such as an IMU. In particular, the orientation sensor may be an accelerometer. The orientation sensor may use the gravitational forces of the earth to determine, which orientation the aircraft navigation light is in. Using an inertial sensor as the orientation sensor may allow for choosing the desired color without any external signal.

The orientation sensor may be an optical sensor, in particular a horizon detector. The optical sensor may analyze an optical input indicative of the environment of the aircraft navigation light. For example, the optical sensor may be a camera capturing one or more images of the environment of the aircraft navigation light. The resultant images may then be analyzed for determining the position of the aircraft navigation light within the aircraft and for selecting an according color. It is possible that the optical sensor has targeted image data processing capabilities. For example, the optical sensor may be configured to detect the horizon in the optical input and to distinguish between upwards and downwards orientation on the basis thereof. This distinction may again be used for selecting the appropriate color.

It is also possible that the aircraft navigation light has an orientation sensor and a color selection input. The aircraft navigation light may be configured to only emit light of a certain color if both inputs correspond. It is also possible that the aircraft navigation light generally relies on the orientation sensor, with the color selection input forming an override.

The color selection input may comprise a plurality of connectors, with each of the plurality of connectors corresponding to a particular color selection. In other words, the usage/connection of a particular connector may represent the selection of a particular color. For example, the connection of a particular pin of an elaborate connector structure on the aircraft side to a particular socket on the side of the aircraft navigation light may indicate to the aircraft navigation light that a particular color is appropriate for the given installation position. The mere connection on that pin or the supply of a particular voltage or a particular time-varying signal on that pin may convey the color selection information. The connector structure on the aircraft side may be configured in such a way that it can only connect to the correct connector for a given position of the aircraft navigation light.

According to a further embodiment, the light source comprises the same number of green and red LED(s). In this way, the aircraft navigation light may be designed to have a similar or identical power draw when used as a left or as a right aircraft navigational light. In particular, the light source comprises exactly one green LED and exactly one red LED. In this way, low production costs of the aircraft navigation light may be achieved.

The aircraft navigation light may comprise a plurality of green LEDs and a plurality of red LEDs, wherein the switching circuit may be configured to effect power supply to a selected one or more of the LEDs, depending on a wear state of the LEDs. In other words, the aircraft navigation light may have redundancy for both the green and the red LEDs. Upon detecting a decay in light output or reaching a threshold operation duration of one of the plurality of green LEDs and plurality of red LEDs, the switching circuit may switch off the LED and switch on another LED of the same color. In this way, desired output levels may be maintained over a longer period of time than would be possible with a single LED of a particular color.

It is possible that the optical element and the red light filter are arranged over a plurality of LEDs, the plurality of LEDs comprising the at least one green LED and the at least one red LED. In other words, the plurality of LEDs may have at least one common optical element and one common red light filter. It is also possible that multiple units, each equipped with a red light filter and an optical element as well as at least one green LED and at least one red LED, are provided in the aircraft navigation light. The aircraft navigation light may switch between the units for extending the useful life of the aircraft navigation light. Also, such a setup may provide redundancy in case that one of the units malfunctions.

For aircraft navigation lights usable as left and right forward position lights with a power supply delivering the same current for both positions, at least some embodiments allow for the reduction of green light luminous flux using the red light filter while red light is minimally affected. The color output may remain within aviation green or aviation red color, respective of the LED used.

Using a single type of red light filter may be beneficial in order to balance light output luminous flux for red and green, when the aircraft navigational light is usable as a left and right forward position light. The red light filter may be designed such that the ratio of attenuation for green LED and red LED frequencies is inversely proportional to the ratio of luminous flux for the said LEDs.

The described embodiments may result in a cost reduction and a part number reduction as only one power supply with a predefined LED current can be used for both left and right aircraft navigation lights.

In previous approaches, when using the same LED current, the green LED may be considered too bright. At least some of the present embodiments allow for a selective reduction in brightness of green light, in order to bring the aircraft navigation light in line with regulatory requirements and/or design goals.

Exemplary embodiments of the invention further include an aircraft, comprising at least one aircraft navigation light according to any of the embodiments above.

The aircraft may be an airplane, a helicopter or an unmanned aerial vehicle.

The aircraft may comprise a left aircraft navigation light and a right aircraft navigation light according to any of the embodiments above. In particular, the left aircraft navigation light may be mounted to a left wing tip, in particular the left wing tip of an airplane, and the right aircraft navigation light may be mounted to a right wing tip, in particular the right wing tip of an airplane.

Exemplary embodiments of the invention further comprise a method of producing an aircraft navigation light. The method comprises the steps of:

providing a support portion;

providing a light source comprising at least one green LED;

arranging the light source on the support;

molding an optical element over the light source; and molding a red light filter over the optical element.

The additional features, modifications, and beneficial effects, described above with respect to the exemplary embodiments of the aircraft navigation light, apply to the aircraft and the method of producing an aircraft navigation light in an analogous manner.

BRIEF DESCRIPTION OF THE DRAWINGS

Exemplary embodiments of the invention are described in detail below with reference to the figures, wherein.

DETAILED DESCRIPTION

Figure 1:
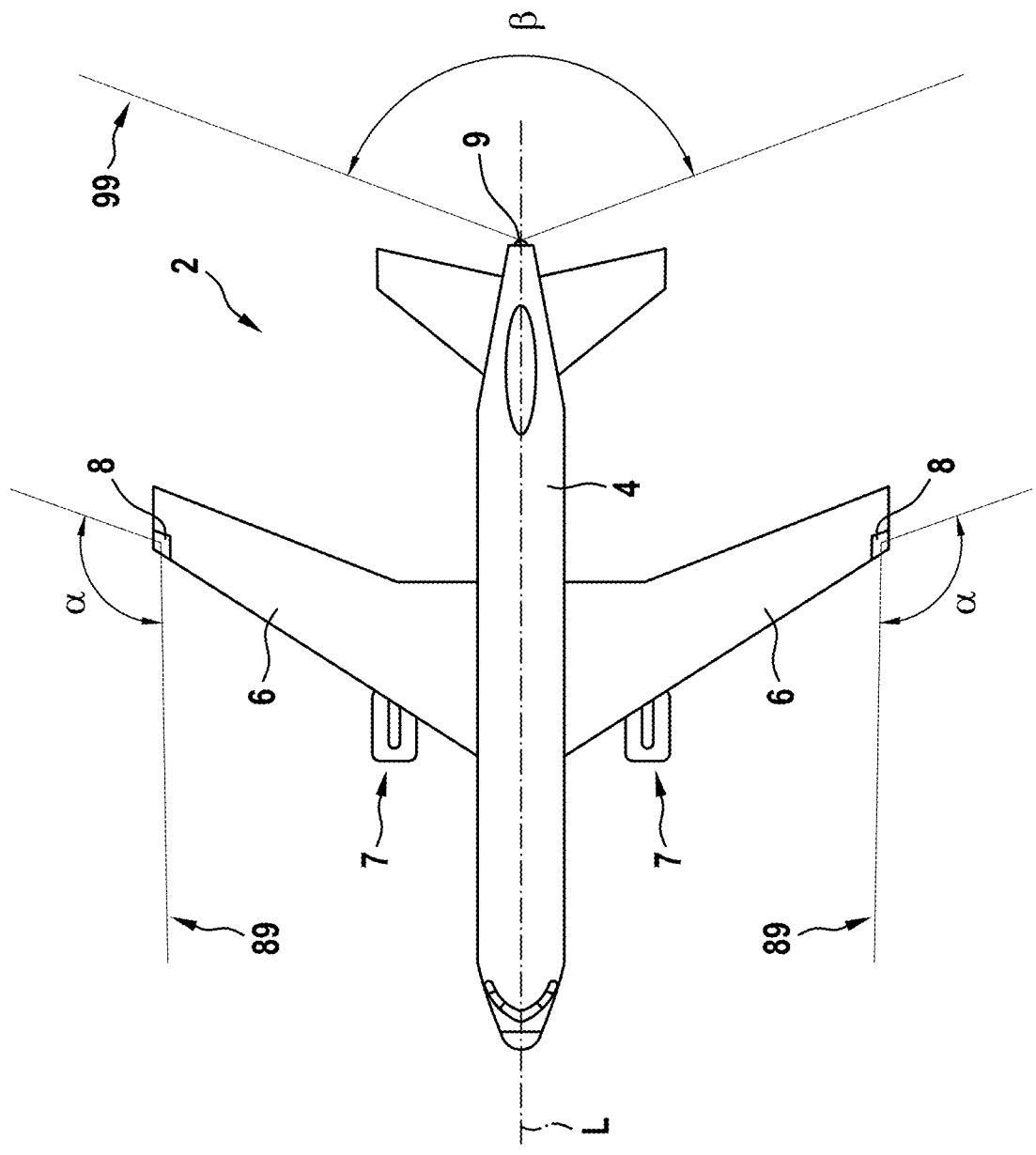
FIG. 1 depicts a schematic top view of an aircraft in accordance with an exemplary embodiment of the invention, the aircraft being equipped with aircraft navigation lights.

FIG. 1 depicts a schematic top view of an aircraft 2, in particular an airplane 2, comprising a fuselage 4 and two wings 6 extending laterally from the fuselage 4. An engine 7 is mounted to each of the wings 6, respectively.

The aircraft 2 is provided with aircraft navigation lights 8, 9, comprising two aircraft forward positions lights 8, also referred to as forward aircraft navigation lights 8, mounted to the wing tips of the wings, and a tail navigation light 9, mounted to the tail end of the fuselage 4. As will be explained below, the forward position lights 8 are aircraft navigation lights in accordance with an exemplary embodiment of the invention.

When projected onto a virtual horizontal plane, the light output 89 emitted by the aircraft navigation lights 8 covers an area extending from the direction of flight, i.e. 0°, which is parallel to a longitudinal axis L of the aircraft 2, outwardly over an angle α of 110°, i.e. 20° in the rearward direction. The aircraft navigation light 8 mounted to the starboard side, i.e. to the right side when viewed in the direction of flight, emits green light, and the aircraft navigation light 8 mounted to the port side, i.e. to the left side when viewed in the direction of flight, emits red light. As will be explained below, both aircraft navigation lights 8 have at least one red light source and at least one green light source. Due to their position in the aircraft frame of reference, they emit either red light only or green light only.

The tail navigation light 9 emits a white light output 99. The light output 99 of the tail navigation light 9 extends over an angle β of 140°(+/−) 70° in the virtual horizontal plane. The light output 99 of the tail navigation light 9 is centered around the longitudinal axis L of the aircraft 2. In the embodiment shown in FIG. 1, the tail navigation light 9 is a single-mode aircraft navigation light, capable of emitting white light only.

The light outputs 89, 99 of the three aircraft navigation lights 8, 9, in combination, cover a full circle of 360° so that one of the three aircraft navigation lights 8, 9 is visible from any position around the aircraft 2.

Figure 2:
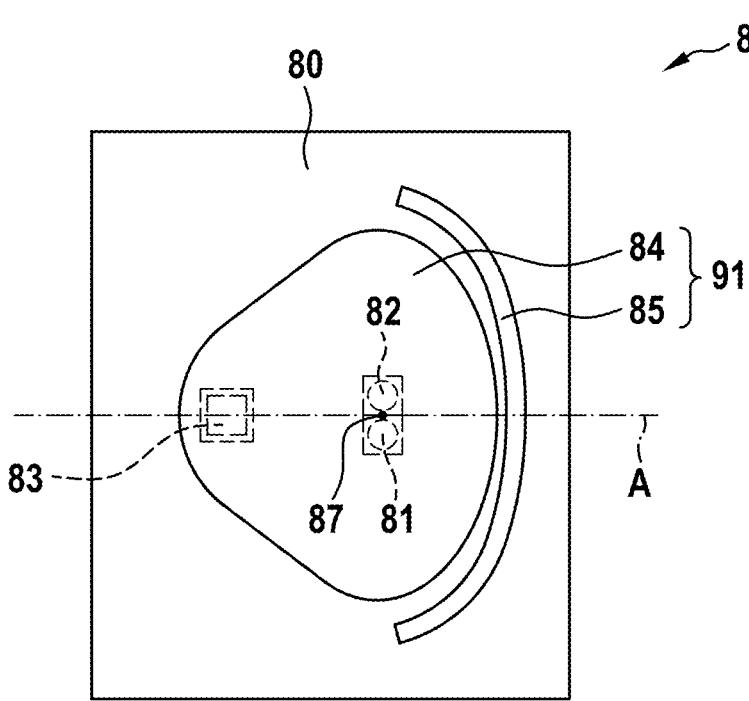
FIG. 2 shows a schematic top view of an aircraft navigation light according to an exemplary embodiment of the invention.

FIG. 2 shows a schematic top view of an aircraft navigation light 8 in accordance with an exemplary embodiment of the invention. The top view of FIG. 2 is denoted top view in the aircraft light frame of reference. The aircraft navigation light 8 of FIG. 2 may be used as either of the two aircraft navigation lights 8, depicted in FIG. 1.

The aircraft navigation light 8 comprises a light source 81, 82, comprising a green LED 81 and a red LED 82, mounted to a support portion 80.

The common support 80 may be a printed circuit board (PCB), provided with electrical connections, which are configured for supplying electrical power to the light source 81, 82.

The light source 81, 82 is covered by a common, at least partially transparent or translucent lens 84. More generally, the lens 84 may be referred to as an optical element of the aircraft navigation light, in particular a common optical element for the green LED 81 and the red LED 82. The lens 84 may be overmolded over the green and red LEDs 81, 82. It may thus be in direct contact with the green and red LEDs 81, 82. The lens 84 provides a transparent cover, covering and tightly encasing the green and red LEDs 81, 82 with respect to the support portion 80, thus protecting the green and red LEDs 81, 82. The lens 84 may be made of silicone, in particular of silicone having a refractive index of about 1.4.

In the exemplary embodiment of FIG. 2, the lens 84 has a red light filter arranged thereon. The red light filter covers the entire outer contour of the lens 84 and, thus, substantially co-extends with the lens 84 in the depicted top view of FIG. 2. The arrangement of the red light filter on the lens 84 will be illustrated and described in more detail below with respect to FIG. 3*a*.

In an alternative embodiment, the lens 84 may act as a red light filter, e.g., by filter components being mixed into the material of the lens 84, such as silicone. The lens 84 may contain red particles or a red dye. This way, the lens 84 is identical with the red light filter. In other words, the red light filter is integrated into the lens 84.

In each of said embodiments, the red light filter may reduce the transmission of some colors of light to a larger extent than that of red light. For example, the transmission of green light is reduced when compared to the transmission of red light. For the same current driving an LED, green LEDs 81 frequently show a much higher luminous flux than red LEDs 82. In order to reduce the difference in luminous flux of the green LED 81 and the red LED 82 when using the same driving currents, the red light filter can be employed.

The filter effect depends on transmission through the silicone. A suitable value for attenuation in red vs. green spectrum may be 15% of attenuation per mm of filter thickness. The lens 84 itself or the red light filter on the lens 84 may comprise or consist of silicone with a red pigment. In particular, the silicone may be pigmented with 4% (mass) red pigment and mixed homogenously. Pigmentation of the base material of the lens 84 or of the base material of the red light filter arranged on the lens 84, which base material may e.g. be silicone, may result in reduction in the intensity of the green light source by ca. 40% and of the red light source by ca. 5%. The silicone for the red light filter may be Dow MS-1002 and the red pigment may be Nusil MED50-4900 77074. The red light filter may be molded on top of the LEDs 81, 82/on top of the lens 84 at a thickness of, e.g., 3 mm. The pigment may cause diffusion of light, but a shutter element 85 may block light that is diffused towards undesired angles of emission. The lens 84 not only covers the green and red LEDs 81, 82, but further forms part of an optical system 91 for the green and red LEDs 81, 82 and is configured for shaping the light output 89 emitted by the aircraft navigation light 8. It can also be said that the optical system 91, in particular the lens 84 thereof, conditions the light emitted by the green and red LEDs 81, 82. In the exemplary embodiments of FIGS. 2-4, the lens 84 mainly conditions the light of the green and red LEDs 81, 82 via its refractive light exit surface 86. It is understood that other geometries may be used for the lens 84. In particular, more complex geometries may be used, in order to fulfill the light intensity requirements for the aircraft navigation light in a particularly efficient manner.

The optical system 91 comprising the lens 84 may be configured to generate the desired light output 89 extending over an angle α of 110°, as it is shown in FIG. 1. The aircraft navigation light 8 additionally may be provided with a common shutter element 85, which is also part of the optical system 91, and which is configured to block any light emitted beyond the direction of flight, i.e. configured to block any light towards the sector of the respectively other one of the two aircraft navigation lights 8.

The shutter element 85 and the lens 84 are formed symmetrically with respect to a plane of symmetry A, shown in FIG. 2 and extending through the aircraft navigation light 8. The plane of symmetry A is oriented horizontally, when the aircraft navigation light 8 is mounted to the aircraft 2. The optical system 91, including the lens 84 and the shutter element 85, is designed for shaping the light emitted by a light source which is arranged at a nominal light source location 87, also referred to as reference point 87, as shown in FIGS. 2 and 4 and located on said plane of symmetry A.

Figure 3A:
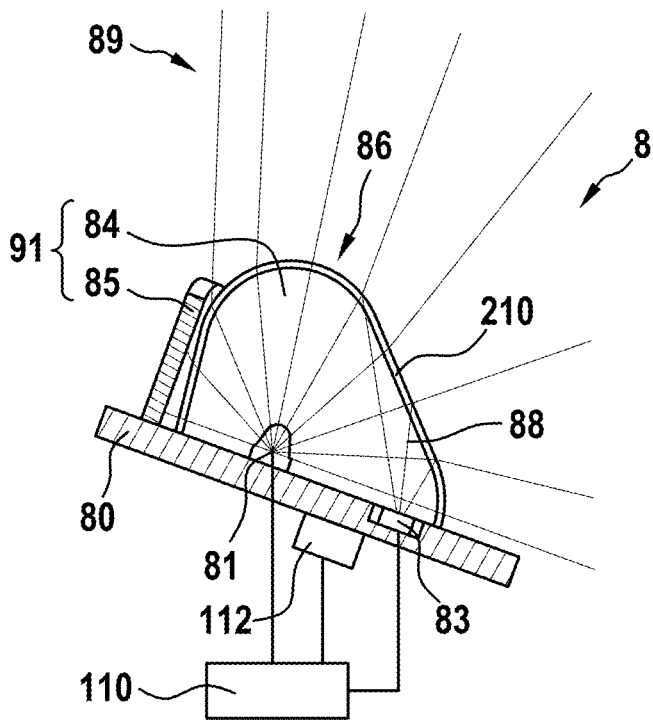
FIG. 3*a* shows a schematic cross-sectional view of the aircraft navigation light of FIG. 2.
Figure 3B:
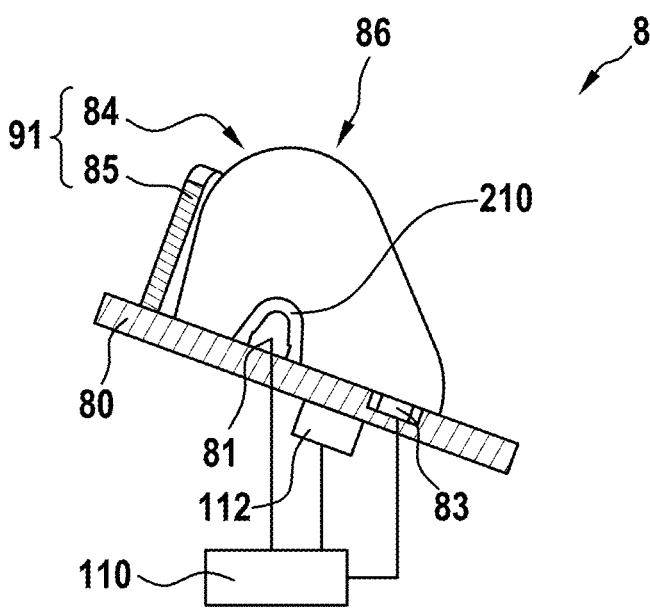
FIG. 3*b* shows a schematic cross-sectional view of a first modification of the aircraft navigation light of FIG. 2, the first modification also forming an exemplary embodiment of the invention.
Figure 3C:
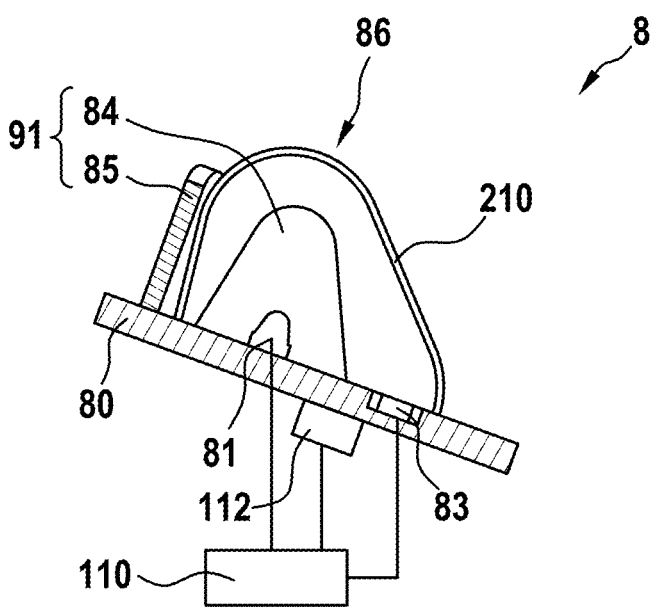
FIG. 3*c* shows a schematic cross-sectional view of a second modification of the aircraft navigation light of FIG. 2, the second modification also forming an exemplary embodiment of the invention.
Figure 4:
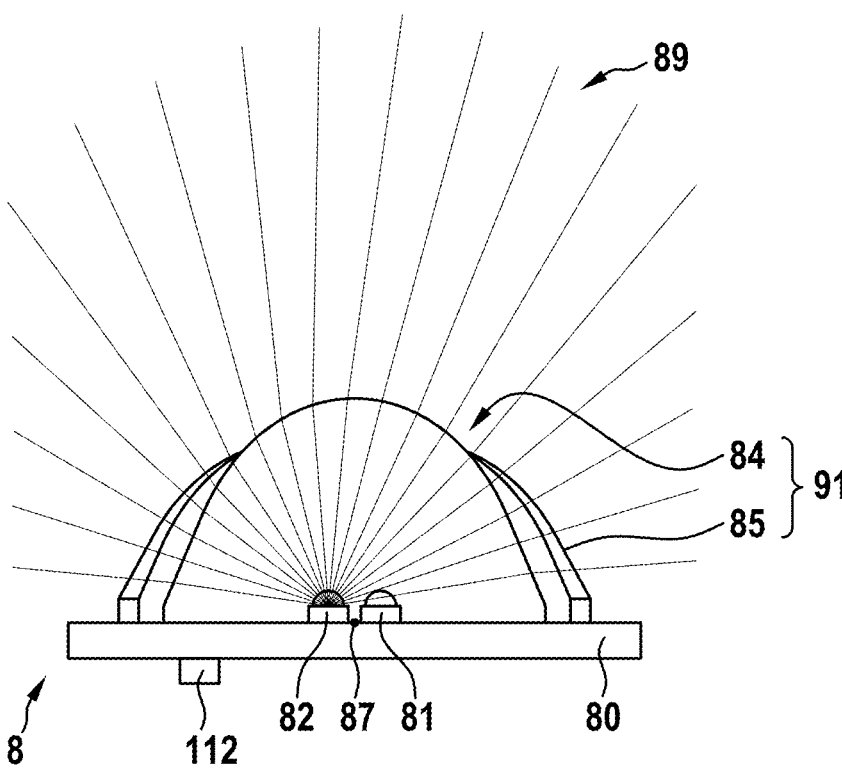
FIG. 4 shows a schematic front view of the aircraft navigation light of FIG. 2.

In the embodiment shown in FIGS. 2 to 4, none of the green and red LEDs 81, 82 are arranged exactly at said reference point 87. Instead, both green and red LEDs 81, 82 are arranged symmetrically with respect to the plane of symmetry A at the same distance from the reference point 87. It is also possible that both the green LED 81 and the red LED 82 are arranged along the plane of symmetry A, i.e. along the line indicated with A in FIG. 2.

The optical system 91 is designed so that small deviations of the positions of the green and red LEDs from the optimal reference point 87 do not considerably deteriorate the quality of the light output 89 of the aircraft navigation light 8. I.e., the optical system 91 and the green and red LEDs 81, 82 are designed so that a desired light output 89 having a desired light intensity distribution is generated and emitted by the aircraft navigation light 8 despite the fact that none of the green and red LEDs 81, 82 is arranged exactly at the reference point 87. Rather, the common optical system 91 and the green and red LEDs 81, 82 are designed so that a desired light intensity distribution is achieved regardless of which one of the green and red LEDs is switched on. In order to achieve this feature, the extension of the optical system may be at least an order of magnitude greater than the distance between the centers of the green and red LEDs 81, 82. In other words, the green and red LEDs 81, 82 may be arranged very close to each other, as compared to the extension of the optical system 91. For example, the optical system 91 may have an extension of between 20 mm and 50 mm, while the distance between the centers of the green and red LEDs may be in the range of between 1 mm and 5 mm.

Depending on which LED is switched on, the aircraft navigation light 8 may emit red light or green light. Due to above described design of the green and red LEDs 81, 82 being positioned closely to the reference point 87 and the optical system 91 having a large extension as compared to the offset from the reference point 87, the output light intensity distribution is similar for red light and green light. The same aircraft navigation light 8 may be used both on the left side of the aircraft 2 and on the right side of the aircraft 2. With a suitable selection of the LED to be operated, the aircraft navigation light 8 may assume the functionality of either one of a right forward navigation light and a left forward navigation light.

In addition to the green and red LEDs 81, 82, a wear detector 83, which is a photo detector, is mounted to the support portion 80. The wear detector 83 is also covered and tightly encased with respect to the support portion 80 by the lens 84. In the depicted exemplary embodiment, the wear detector 83 is arranged around the plane of symmetry A, extending through the aircraft navigation light 8. As a result, the green and red LEDs 81, 82 are arranged symmetrically with respect to the wear detector 83. It is pointed out that the wear detector is an entirely optional element and may also be dispensed with.

In a region close to the shutter element 85, which is depicted on the right side in FIGS. 2 and 3a-c, the lens 84 has a curved portion with a curved cross-section, which is shaped for providing the desired light output 89. In a region more distant from the shutter element 85, i.e. in a region more to the left in FIGS. 2 and 3a-c, the lens 84 has a linear portion with a linear cross-section, which also contributes to generating the desired light output 89. A portion 88 of the light emitted by the green and red LEDs 81, 82 is reflected by this linear portion of the lens 84 towards the wear detector 83. Based on the amount of reflected light, which is detected by the wear detector 83, the wear state of each of green and red LEDs 81, 82 may be determined. The linear portion of the lens 84 may be partially refractive and partially reflective for the given incident angles of the light from the green and red LEDs 81, 82. It is pointed out that the given shape/design of the lens 84 is exemplary only and that various other shapes/designs may be provided.

As depicted as schematic function blocks in FIG. 3a-c, the aircraft navigation light 8 has a switching circuit 110 and an orientation sensor 112. The switching circuit 110 is coupled to the green and red LEDs 81, 82 and may impact power to be supplied to either one of the green and red LEDs 81, 82. In this way, the switching circuit 110 may determine the color of the light output to be red or green.

The orientation sensor 112 is an inertial sensor in the depicted exemplary embodiment. It is configured to determine, due to its orientation with respect to ground, whether the aircraft navigation light 8 is positioned on the right side of the aircraft 2 or on the left side of the aircraft 2. The orientation sensor 112 is coupled to the switching circuit 110 and communicates an orientation indication to the switching circuit 110. The switching circuit 110 interprets said orientation indication as a color selection signal and selectively switches on the green LED 81 or the red LED 82.

The wear detector 83 is also coupled to the switching circuit 110 in the depicted exemplary embodiment. In the depicted exemplary embodiment, the switching circuit 110 only passes on the information from the wear detector 83 to an outside entity, such as to the board computer. It is also possible that the switching circuit takes action in response to the information from the wear detector 83, as will be explained below.

FIGS. 3a-c show three versions of an aircraft navigation light 8 in accordance with exemplary embodiments of the invention in a cross-sectional view, taken along the plane of symmetry A, indicated in FIG. 2. It is assumed that the viewing direction towards the aircraft navigation light 8 is from the top in the aircraft frame of reference in FIGS. 3a-c and that the direction of flight, i.e. the forward direction in the aircraft frame of reference, is upwards in the viewing plane of FIGS. 3a-c. Hence, the aircraft navigation light 8 of FIGS. 3a-c is mounted to the aircraft 2 as a right forward navigation light. This can be seen from the light output 89, which ranges from forward in the aircraft frame of reference to the right, slightly rearward side.

In operation, the orientation sensor 112 detects the orientation of the aircraft navigation light 8 with respect to the ground. In this way, the orientation sensor 112 deduces in operation that the aircraft navigation light 8 is mounted to the right side of the aircraft 2. On the basis of this information, the switching circuit 110 effects power supply to the green LED 81 and does not impact power supply to the red LED 82. Accordingly, the aircraft navigation light 8 emits the desired green light output, commensurate with its position on the right side of the aircraft 2.

FIG. 3a shows a schematic cross-sectional view of the aircraft navigation light of FIG. 2. In the embodiment of FIG. 3a, a red light filter 210 is arranged as an outer layer on top of the lens 84 of the optical system 91. The red light filter 210 is, thus, immediately adjacent to the lens 84. In the production method to create the forward position light 8 of FIG. 3a, the green LED 81 and the red LED 82 (not shown) are soldered onto the support portion 80, which may be implemented as a PCB. Subsequently, the lens 84 of the optical system 91 may be overmolded on top of the green and red LEDs 81, 82. Then, the red light filter 210 is molded on top of the lens 84. A gap or intermediate element between the red light filter 210 and the lens 84 of the optical system 91 does not exist. In this way, the red light filter 210 covers the top of the lens 84. This method may allow the production of a red light filter 210 with a predefined homogenous thickness in a particularly efficient manner, thus enabling the creation of a homogenous spectrum of light across different angles of light emitted from the aircraft navigation light 8.

FIG. 3b shows a schematic cross-sectional view of a first modification of the aircraft navigation light of FIG. 3a. In FIG. 3b, the red light filter 210 is molded on top of the green LED 81 and the red LED 82 (not shown). The lens 84 of the optical system 91 is positioned on top of the red light filter 210. There is no gap or intermediate element between the red light filter 210 and the lens 84 of the optical system 91. This design may allow the reduction in volume of the red light filter 210, which may lead to potential reductions in production costs. Furthermore, the design may enable a particularly efficient production of a red light filter 210 with a homogenous thickness when considering the optical path from the LEDs 81, 82 to the outside of the aircraft navigation light 8, thus enabling a homogenous spectrum of light emitted across different angles.

FIG. 3c shows a schematic cross-sectional view of a second modification of the aircraft navigation light of FIG. 3a. In FIG. 3c, the lens 84 of the optical system 91 is molded over the green LED 81 and the red LED 82 (not shown). There is a gap between the lens 84 of the optical system 91 and the red light filter 210. The gap may be filled with a gas, such as air, it may contain a vacuum or contain an intermediate element, which is transparent and preserves the width of the gap between the lens 84 and the red light filter 210. If the gap is filled with the gas and does not contain the intermediate element, the red light filter 210 may comprise a stiff material, such as hard plastic, to preserve the shape of the red light filter 210. In this embodiment, the lens 84 and the red light filter 210 are potentially not connected to each other at all. The intermediate element may be removably connected to the red light filter 210 and to the lens 84. Thus, the red light filter 210 and the optical system 91 may be produced independently of each other and may be mounted and removed separately.

FIG. 4 illustrates, for the operating condition of FIGS. 3a-c, that the red LED 82 emits light, while the green LED 81 is inactive. The resulting light output 89 is red. When the green LED 81 emits light, while the red LED 82 is inactive, the resulting light output 89 is green. While the green and red LEDs 81, 82 are shown as dome-shaped for better illustration, it is apparent that the green and red LEDs 81, 82 may be substantially flat structures, keeping the mutual shadowing effects low. In FIG. 4, the red light filter 210 may be arranged on top of the lens 84, as for example illustrated in FIG. 3a, or may be identical with the lens 84.

Figure 5:
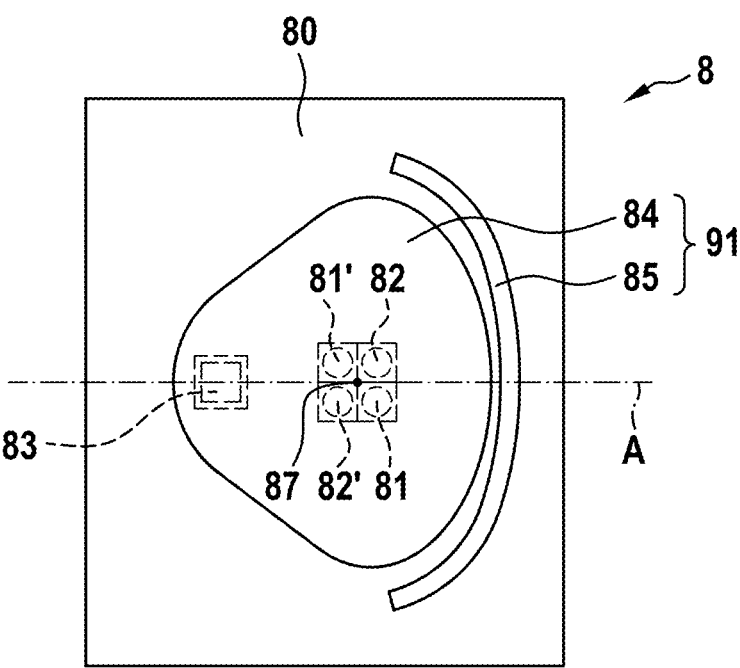
FIG. 5 shows a schematic top view of an aircraft navigation light according to another exemplary embodiment of the invention.

FIG. 5 shows a schematic top view of an aircraft navigation light 8 according to another exemplary embodiment of the invention. The exemplary embodiment of FIG. 5 is similar to the embodiment of FIGS. 2-4, and reference is made to above description of FIGS. 2-4 for the discussion of alike components. Again, the red light filter 210 may be arranged on the lens 84 or may be identical with the lens 84 or may have any other suitable set-up, as for example described above with respect to FIGS. 3a-3c. The aircraft navigation light 8 of FIG. 5 has two green LEDs 81, 81' and two red LEDs 82, 82'. The additional green and red LEDs 81' and 82' are provided for redundancy purposes. When a weak light emission or no light emission by the green LED 81 or the red LED 82 is detected, the aircraft navigation light 8 switches over to the additional green LED 81' or the additional red LED 82'. The two green LEDs 81, 81' and the two red LEDs 82, 82' are arranged around the reference point 87.

Figure 6:
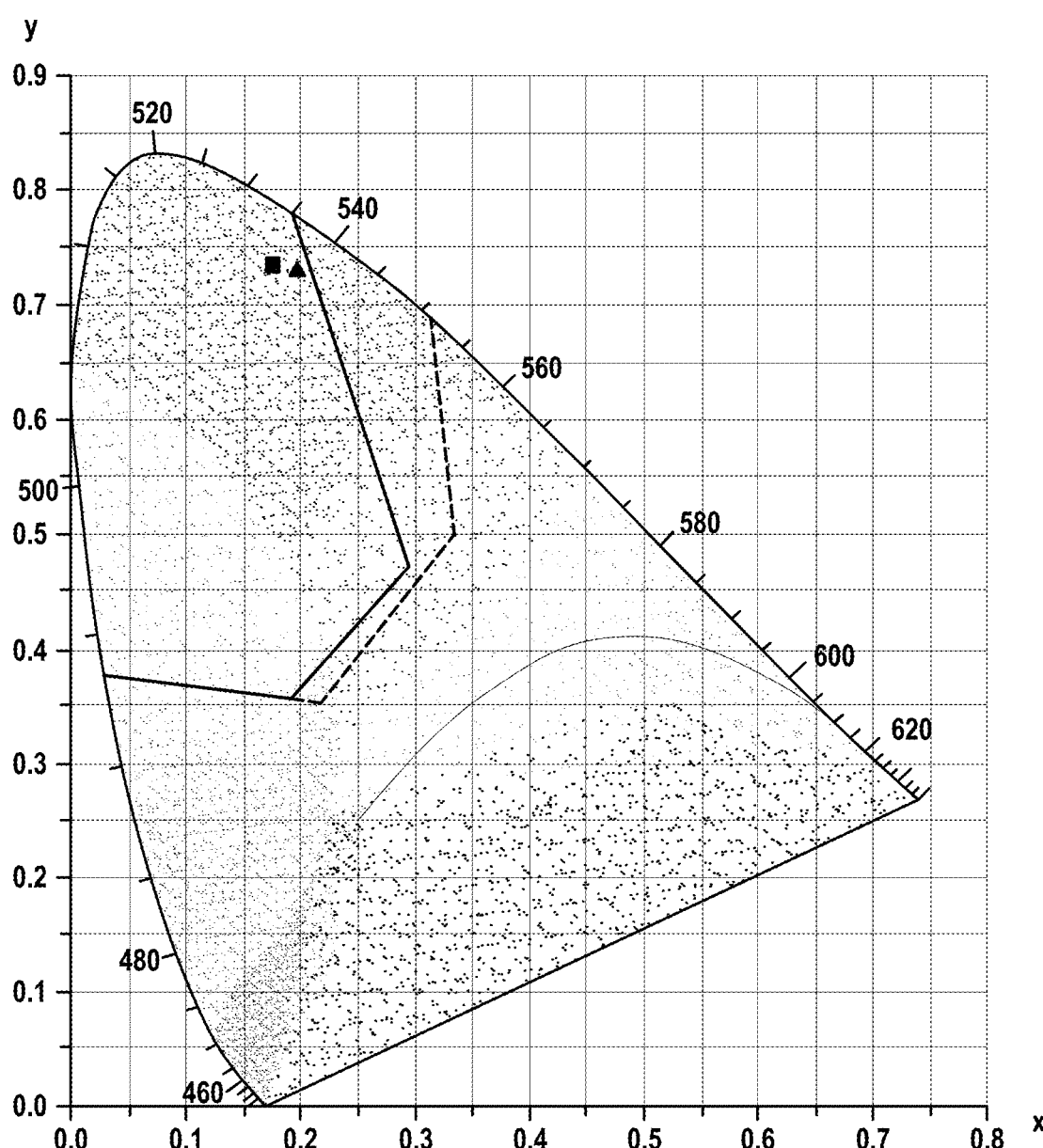
FIG. 6 shows a schematic representation of the CIE 1931 chromaticity diagram, indicating the color of the aircraft navigation light output of an aircraft navigation light according to an exemplary embodiment of the invention.

FIG. 6 depicts a schematic representation of the CIE 1931 chromaticity diagram, i.e. a schematic representation of the International Commission on Illumination (CIE) 1931 XYZ color space. FIG. 6 is a grey-scale representation of said diagram. While the diagram is per definition in color, the grey-scale representation allows for illustrating various considerations underlying aircraft navigation lights. Also, the CIE 1931 chromaticity diagram is readily available to the public, such that the explanations given herein can be easily read in conjunction with a color version of the CIE 1931 chromaticity diagram. A color version of the CIE 1931 chromaticity diagram is incorporated herein by reference.

In FIG. 6, the color space for aviation green color according to FAR (25.1397) is demarcated with a solid line in the upper part of the diagram, partly overlapping with the SAE (AS 8037) aviation green color demarcated with a dashed line. The solid square shows the shade of green light of the green LED 81 in the color space. The position of the green LED 81 in the color space is, thus, within the color space for aviation green color as defined by both FAR and SAE. The use of the red light filter 210 on top of the green LED 81 results in a position in the color space as shown by a triangle in FIG. 6. The shift from square to triangle is small in this example. The triangle is within the color space for aviation green color as defined by both FAR and SAE. Thus, the addition of the red light filter 210 is not problematic in terms of the position in the color space of the aviation green color. The aircraft navigation light 8 containing a red light filter 210 on top of the green LED 81 is able to produce green in aviation green color. Not shown in FIG. 6, the red LED 82 is in the color space of aviation red color without the red light filter 82. The addition of the red light filter 210 shifts the red light slightly within the color space. However, the red light emitted from the red LED 82 remains within the color space of aviation red color according to both FAR and SAE when a red light filter 210 is added on top of the red LED 82. Thus, in this example, the red light filter 210 shifts the green and red light within the color space, but the resultant colors remain in the space defined by both FAR and SAE for the respective colors.

While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. An aircraft navigation light, comprising:
a support portion;
a light source comprising at least one green LED and at least one red LED, the light source being arranged on the support portion;
an optical element arranged over the light source for shaping an aircraft navigation light output;
a switching circuit configured to either supply the at least one green LED or the at least one red LED with electricity;
an orientation sensor configured to detect an orientation of the aircraft navigation light and provide an orientation indication to the switching circuit; and
a red light filter.

2. The aircraft navigation light according to claim 1, wherein the red light filter is integrated in or identical to the optical element.

3. The aircraft navigation light according to claim 1, wherein the red light filter is arranged such that light emitted from the light source passes through the red light filter either before or after the light passes through the optical element.

4. The aircraft navigation light according to claim 3, wherein the red light filter is immediately adjacent to the optical element.

5. The aircraft navigation light according to claim 3, wherein a gap or an intermediate element is positioned between the red light filter and the optical element.

6. The aircraft navigation light according to claim 1,
wherein the red light filter contains silicone or consists of silicone, in particular enhanced with red pigments, and/or
wherein the optical element contains silicone or consists of silicone.

7. The aircraft navigation light according to claim 1, wherein the aircraft navigation light output satisfies a set of Federal Aviation Regulation requirements for forward navigation lights.

8. The aircraft navigation light according to claim 1, wherein the aircraft navigation light is configured to be usable as left forward navigation light, which emits red light, and as a right forward navigation light, which emits green light.

9. The aircraft navigation light according to claim 8, wherein the luminous flux of the aircraft navigation light, when employed as a left forward navigation light and when the red LED is supplied with a predefined electrical current, is between 80% and 120% of the luminous flux of the aircraft navigation light, when employed as a right forward navigation light and when the green LED is supplied with the said predefined electrical current.

10. The aircraft navigation light according to claim 8, wherein the luminous flux of the aircraft navigation light, when employed as a left forward navigation light and when the red LED is supplied with a predefined electrical current, is between 90% and 110%, of the luminous flux of the aircraft navigation light, when employed as a right forward navigation light and when the green LED is supplied with the said predefined electrical current.

11. The aircraft navigation light according to claim 1, comprising a joint power supply for the at least one green LED and the at least one red LED.

12. The aircraft navigation light according to claim 1, wherein the light source comprises the same number of green LEDs as of red LEDs.

13. The aircraft, such as an airplane, comprising at least one aircraft navigation light according to claim 1, wherein the aircraft navigation light is mounted to the exterior of the aircraft.

14. A method of producing the aircraft navigation light of claim 1, comprising the steps of:
arranging the light source on the support portion;
molding the optical element over the light source; and
molding the red light filter over the optical element.

15. The aircraft, such as an airplane, comprising at least one aircraft navigation light according to claim 1, wherein the aircraft navigation light is mounted to a wing tip region of the aircraft.

16. An aircraft navigation light, comprising:
a support portion;
a light source comprising at least one green LED and at least one red LED, the light source being arranged on the support portion;
an optical element arranged over the light source for shaping an aircraft navigation light output;
a switching circuit configured to either supply the at least one green LED or the at least one red LED with electricity on the basis of a color selection signal; and
a red light filter;
wherein the aircraft navigation light is configured to be usable as left forward navigation light, which emits red light, and as a right forward navigation light, which emits green light,
wherein the luminous flux of the aircraft navigation light, when employed as a left forward navigation light and when the at least one red LED is supplied with a predefined electrical current, is between 80% and 120% of the luminous flux of the aircraft navigation light, when employed as a right forward navigation light and when the at least one green LED is supplied with the said predefined electrical current.

17. The aircraft navigation light according to claim 16, wherein the red light filter is integrated in or identical to the optical element.

18. The aircraft navigation light according to claim 16, wherein the red light filter is arranged such that light emitted from the light source passes through the red light filter either before or after the light passes through the optical element.

19. The aircraft navigation light according to claim 18, wherein the red light filter is immediately adjacent to the optical element.

20. The aircraft navigation light according to claim 18, wherein a gap or an intermediate element is positioned between the red light filter and the optical element.

* * * * *